Feb. 7, 1967  K. RAUCH ET AL  3,303,108
PURIFICATION OF ALKANOLS HAVING THREE TO FIVE CARBON ATOMS
BY DISTILLATION OF THE ALKANOL FROM A CRUDE MIXTURE IN
A SINGLE COLUMN IN THE PRESENCE OF WATER
Filed Nov. 18, 1964
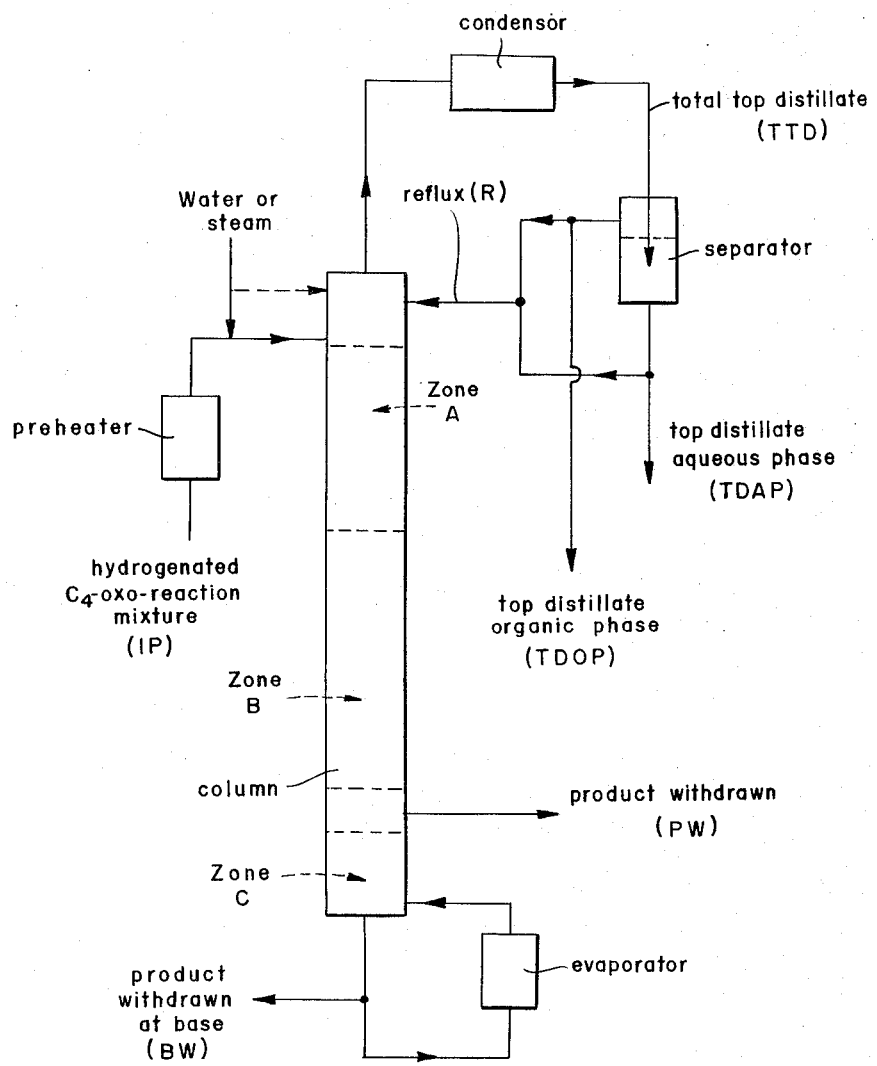
INVENTORS:
KONRAD RAUCH
WALTER SCHEIDMEIR
BY: Marzall, Johnston, Cook & Root
ATT'YS

United States Patent Office 3,303,108
Patented Feb. 7, 1967

3,303,108
PURIFICATION OF ALKANOLS HAVING THREE TO FIVE CARBON ATOMS BY DISTILLATION OF THE ALKANOL FROM A CRUDE MIXTURE IN A SINGLE COLUMN IN THE PRESENCE OF WATER
Konrad Rauch, Limbergerhof, Pfalz, and Walter Scheidmeir, Ludwigshafen (Rhine), Germany, assignors to Badische Anilin- & Soda-Fabrik Aktiengesellschaft, Ludwigshafen (Rhine), Germany
Filed Nov. 18, 1964, Ser. No. 412,255
Claims priority, application Germany, Nov. 22, 1963, B 74,353
10 Claims. (Cl. 203—96)

This invention relates to a new process for the purification of alkanols having three to five carbon atoms which have been obtained by oxo reaction of olefins.

It is known that aldehydes may be prepared by reaction of olefins with carbon monoxide and hydrogen in the presence of cobalt carbonyl compounds at elevated temperatures and under superatmospheric pressure. This reaction is known as the oxo reaction. $C_3$- to $C_5$-aldehydes are obtained by this method from $C_2$- to $C_4$-olefins. After the cobalt catalyst has been removed, the aldehydes may be hydrogenated to the corresponding alcohols. Both the oxo reaction and the hydrogenation may be carried out in the presence of water. The alcohols are then recovered by distillation of the hydrogenation mixture. It has been found that certain impurities remain persistently with the alcohols. These impurities are hydrocarbons, ethers, ketones or aldehydes. As a rule they form binary azeotropes with the alcohols to be recovered and ternary azeotropes with the alcohols and water, the boiling points of these azeotropes being often in the immediate neighborhood of the boiling points of the pure alcohols so that the cost of a complete separation by distillation is high. For example the difference in boiling points of the azeotrope of n-butanol and di-n-butyl ether and of n-butanol itself is only 1.3° C.

In the process of U.S. patent specification No. 2,991,232 use is made of the known fact that certain impurities form with the alcohols and water low boiling ternary azeotropes in order to separate these impurities. High boiling constituents, such as ballast oil, are removed in a first distillation and the distillate is then introduced into a second column at a point not near to the ends and is distilled therein at atmospheric pressure in the presence of a maximum of 10% of water vapor with reference to the weight of dry feed. It is advantageous to introduce some steam at the base of the column or in the immediate vicinity of the base of the column. The alcohols which are withdrawn as a base residue are then dehydrated in a third distillation. In this prior art method, three columns are therefore required and moreover a high reflux ratio is used (according to column 4, lines 51–52, a reflux ratio of 20:1) and this involves high energy consumption. It is true that it is stated in column 5 that the third column may be dispensed with and the dehydration may be carried out in the second column provided several trays are arranged beneath the point of entry of steam. The completest possible separation also of the water would be very desirable in the second distillation. For one thing, only a very small water content is acceptable in alcohols which are to serve as lacquer solvents. For another thing, subsequent dehydration in a third column in which the water is separated in the form of an alcohol-water azeotrope is attended by considerable loss of alcohol. It has now been found however that simultaneous dehydration and separation of the said impurities which tenaciously remain with the alcohols is not immediately possible in accordance with the statements in the said U.S. patent specification No. 2,991,232. Satisfactory separation of the impurities may be achieved by introducing steam at the base of the column, but in this case the product at the base is not anhydrous. If the alcohol be withdrawn in anhydrous condition at a point sufficiently far below the steam inlet, it is found that the undesirable impurities are not removed or are not removed to a sufficient extent. Even if incomplete separation of the ethers is tolerated 7 to 11% of the alcohol passes over at the top with the ethers.

In the drawing:

The drawing is a schematic representation of the process, and the abbreviations correspond to those described hereinafter just before Table 1.

In accordance with the present invention it has been found that alkanols having three to five carbon atoms which have been obtained by hydrogenation of oxo reaction mixtures can be advantageously purified in a single column by distillation in the presence of steam with simultaneous dehydration and with the separation of azeotrope formers occurring as byproducts in the oxo reaction, by maintaining in the column below the feed point for the oxo reaction mixture a zone (Zone A) of at least four and advantageously of six to twenty-five theoretical trays in which the water content is 8 to 25%, advantageously 10 to 22% by weight, and maintaining above the point of withdrawal of the rehydrated alkanols freed from azeotrope formers and below the said zone, another zone (Zone B) of at least seven and advantageously of twelve to thirty theoretical trays in which the water content decreases downwardly, so that the alkanols are drawn off at the point of withdrawal in a practically anhydrous condition, advantageously with a water content of less than 0.02% by weight.

In the process according to this invention, (a) Separation of high-boiling constituents,
(b) Dehydration and
(c) Removal of impurities which form azeotropes with the alkanols or with the alkanols and water, can be carried out in a single column.

Another advantage of the process according to the invention is that a lower reflux ratio is required so that energy is saved and that only 3 to 5% by weight of the alcohols present in the crude product need be withdrawn.

The initial material for the process according to this invention are the mixtures, which in general already contain water, which are obtained by reaction of $C_2$- to $C_4$-olefins with carbon monoxide and hydrogen in the oxo reaction and by hydrogenation of oxo reaction mixtures, with or without previous separation of a portion of the aldehydes. The oxo reaction and subsequent hydrogenation do not form part of the present invention. The process according to the invention has particular importance in processing mixtures of butanol and isobutanol which have been produced in the said manner.

The term "azeotrope-forming substances" as used herein is intended to mean substances which form, with the alcohols to be purified, azeotropes whose boiling points are often in the neighborhood of the boiling points of the pure alcohols. They are formed as byproducts in the course of the oxo reaction. Their chemical nature is that of hydrocarbons, ethers or ketones, as already stated. In the case of the purification of butanol, they are compounds which boil between 70° and 145° C. at atmospheric pressure. Di-n-butyl ether, n-butyl isobutyl ether, diisobutyl ether, $C_7$-ketones and $C_7$- to $C_8$-hydrocarbons may be given as examples. Particularly the ethers and the hydrocarbons, which make up the bulk of the azeotrope formers, can be removed without difficulty by the process according to the present invention. At the same time, impurities whose boiling points at atmospheric pressure are below 88° C. or which give azeotropes with water whose boiling points lie below 88° C. are also removed by the process according to this invention. Examples of these are aldehydes, such as n-butyraldehyde and isobutyraldehyde, and formates.

Although the process according to this invention yields anhydrous alcohols, the presence of water vapor in the column is an essential feature of the process according to this invention. It is advantageous to supply water in an amount of 8 to 30% by weight with reference to the organic constituents of the mixture to be separated. The water may be supplied as such or in the form of steam. In the former case, the water is advantageously introduced with the initial mixture to be separated.

The process according to this invention may be carried out in conventional columns. It is advantageous to use sieve plate columns or bubble cap tray columns having twenty to ninety actual trays.

It is an essential feature of the process according to this invention that a zone having a high water content should be maintained below the point at which the initial mixture is supplied, although it would have been expected that a water content below the point of supply of the initial mixture should be avoided in the interests of the completest possible dehydration. It is remarkable that the water content in the zone above the point of supply does not play any decisive part. The initial material containing water may therefore be introduced at the top or in the neighborhood of the top of the column. This is even a preferred embodiment of the process according to this invention.

It is also essential for the success of the separation that below the said zone having a high water content and above the point at which the anhydrous alcohol is drawn off, there should be a zone in which the water content decreases downwardly until the alcohol at the point of withdrawal is practically anhydrous. This is achieved by drawing off the alcohol at least seven theoretical trays, advantageously from twelve to thirty theoretical trays, below the said zone having a high water content. It is self-evident that neither water nor water vapor should be introduced into the zone of low water concentration. Separation of the high-boiling constituents of the initial mixture may be combined with the dehydration and with the removal of the said azeotrope formers by providing below the point of withdrawal of anhydrous alcohol, another zone (zone C) having several, advantageously four to twenty-five, theoretical trays, so that the alcohols are drawn off as a branch stream and the high boiling constituents as a base product. The high boiling constituents are substances having boiling points higher than the alcohols in question, which are also formed as byproducts in the oxo reaction or have been included in the reaction mixture in some other way, but which do not form any azeotropes with the alcohols to be recovered and/or with water and are therefore more easily separated than the azeotrope formers.

The abovementioned zones are maintained by appropriate water supply and by appropriate heating. The water may be supplied with the alcohols or separately. The water may also be wholly or partly recycled, by returning the distillate water into the column.

The maintenance of the two said zones may be supervised by providing on the column at prescribed intervals a number of discharge means by means of which samples may be drawn off from time to time so that their composition may be determined by gas chromatography. It is advantageous also to provide thermocouples in the column. When once it has been determined for a given initial mixture which temperature corresponds to a given composition, the development of the said zones may be determined more simply with reference to the temperatures along the column.

The process according to this invention is advantageously carried out at atmospheric pressure. The reflux ratio should be at least 1:1. It is advantageous to use reflux ratios from 1.5:1 to 8:1. Reflux ratio is defined as the weight ratio of the reflux to the alcohol drawn off.

In a particularly advantageous embodiment of the process, the said zones are maintained by withdrawing from the two phase distillate when working at a reflux ratio of at least 1:1, advantageously at a reflux ratio of 1.5:1 to 6:1, such an amount of water as is equivalent to the amount of water which is introduced into the column in liquid or vapor form. In this connection it should be taken into account that a certain amount of water is also withdrawn with the organic phase. The amount of organic phase withdrawn is at least 1.2 times, advantageously twice to six times, the weight of the azeotrope formers present in the feed. The remainder of the distillate, which has a changed composition with respect to the original composition of the distillate, is then used as reflux. The water content of the reflux is shifted as compared with that of the distillate, as a rule by at least 20% by weight, and is between 16 and 45% by weight. The use of a reflux having a different composition from the distillate is an essential feature of this particular embodiment of the process according to this invention. In this way the said zones which are important for the success of the separation can be maintained with a minimum consumption of energy, i.e. with a particularly low reflux ratio.

The invention is further illustrated by the following example.

*Example*

The column used is a bubble cap tray column having fifty-five trays with an efficiency of 0.6.

500 g. per hour of hydrogenated $C_4$-oxo-reaction mixture containing 14.09% of water is heated to boiling temperature and introduced at the forty-ninth tray, counted from the still. 400 g. per hour of anhydrous product is drawn off at the fourteenth tray and 8 g. of product from the still. The product distilling over the top of the column passes through a separator. 1300 g. of the organic phase and 360 g. of the aqueous phase of the product distilling over are returned per hour to the column as a reflux at a temperature of 80° C., while 20 g. of the organic phase and 72 g. of the aqueous phase are drawn off.

The composition of the individual products is shown in Table 1. The water content of the distillate is 75.90%. The water content of the reflux is shifted to 40.21% by return of various constituents of the phases of the distillate.

The water content and ether content at the individual trays is given in Table 2.

2.9% of the butanol supplied is discharged over the top for the separation; of this only 0.5% is the more valuable n-butanol.

In the Table 1, the columns have the following meaning: IP=initial product; TDOP=top distillate organic phase; TDAP=top distillate aqueous phase; TTD=total top disillate (i.e. aqueous and organic phases); R=reflux; PW=product withdrawn; BW=product withdrawn at base.

TABLE 1

|  | IP, percent | TDOP, percent | TDAP, percent | TTD, percent | R, percent | PW, percent | BW, percent |
|---|---|---|---|---|---|---|---|
| Isobutyraldehyde | 0.03 | 0.06 |  | 0.01 | 0.04 |  |  |
| n-Butyraldehyde | 0.02 | 0.24 |  | 0.05 | 0.15 |  |  |
| Isobutanol | 36.71 | 54.72 | 5.2 | 95.96 | 36.30 | 41.43 | 0.70 |
| n-Butanol | 45.68 | 6.14 |  | 1.33 | 3.85 | 47.93 | 26.68 |
| Isobutyl formate | 0.07 | 1.68 |  | 0.37 | 1.06 |  |  |
| n-Butyl formate | 0.03 | 1.45 |  | 0.32 | 0.90 |  |  |
| Diisobutyl ether | Trace | 0.19 |  | 0.04 | 0.12 |  |  |
| Butyl isobutyl ether | 0.07 | 1.68 |  | 0.37 | 1.06 |  |  |
| Di-n-butyl ether | 0.93 | 17.23 |  | 3.75 | 10.82 |  | 0.05 |
| Diisopropyl ketone | 0.14 | 2.15 |  | 0.47 | 1.35 |  |  |
| Propyl isopropyl ketone | 0.18 | 0.68 |  | 0.15 | 0.43 | 0.14 | 0.26 |
| Di-n-propyl ketone |  |  |  |  |  |  | 0.13 |
| Other readily volatile substances (mainly hydrocarbons) | 0.77 | 5.90 |  | 1.28 | 3.71 | 0.06 | 0.57 |
| Higher boiling substances (mainly 2-ethylhexanol) | 1.28 |  |  |  |  | 0.44 | 71.61 |
| Water | 14.09 | 7.88 | 94.8 | 75.90 | 40.21 |  |  |

TABLE 2

|  | Water, Percent | Ethers | | |
|---|---|---|---|---|
|  |  | n-n-, Percent | n-i-, Percent | i-i-, Percent |
| 14th tray (product withdrawal) |  |  |  |  |
| 22nd tray |  | 0.04 |  |  |
| 29th tray | 19.78 |  |  |  |
| 37th tray | 18.45 | 0.03 |  |  |
| 45th tray | 20.44 | 0.18 |  |  |
| 52nd tray | 16.37 | 3.14 | 0.11 |  |
| Top | 29.05 | 13.79 | 1.36 | 0.16 |

We claim:

1. A process for the recovery of substantially pure alkanols having 3 to 5 carbon atoms from feed mixtures which have been formed by hydrogenation of oxo-reaction products obtained by reacting olefins having 2 to 4 carbon atoms with carbon monoxide and hydrogen, said mixtures containing hydrocarbons, ethers and ketones which are formed as byproducts in said oxo-reaction and which form azeotropes with said alkanols, by distillation in the presence of water and with simultaneous dehydration in a single column, which comprises (a) feeding said feed mixture to said column, and introducing water in fluid form into said column,
    (b) maintaining in said column below the point of supply of said feed mixtures a first zone having at least four theoretical trays in which the water content is from 8 to 25% by weight,
    (c) maintaining in said column a second zone which is located above the point of withdrawal of said substantially pure alkanols and below said first zone, said second zone comprising at least seven theoretical trays and the water content in said zone decreasing downwardly so that said alkanols at the point of withdrawal are essentially anhydrous,
    (d) withdrawing said essentially anhydrous alkanols below said second zone,
    (e) withdrawing from the top of said column a top distillate and cooling said gaseous mixture to form a two phase condensate consisting of a lower aqueous phase and upper organic phase also containing water,
    (f) withdrawing from said lower, aqueous phase of said two-phase condensate an amount equivalent to the amount of water introduced in said column and from the upper organic phase of said two-phase condensate at least 1.2 times the weight of said azeotrope-forming byproducts present in said feed mixture,
    (g) maintaining said two zones by returning as a reflux to said column the remainder of said two-phase condensate, the said reflux having a composition different from the composition of the top distillate by a drop in percent water in the former as compared with the latter of at least 20% by weight, and
    (h) maintaining the ratio by weight of said reflux to said essentially anhydrous alkanols withdrawn of at least 1:1.

2. A process according to claim 1 wherein said mixture is supplied to the upper portion of said column.

3. A process according to claim 1 wherein said first zone comprises six to twenty-five theoretical trays.

4. A process according to claim 1, wherein the water content in said first zone is from 10 to 22% by weight.

5. A process according to claim 1, wherein said second zone comprises twelve to thirty theoretical trays.

6. A process according to claim 1 wherein an alkanol is drawn off which has a water content of less than 0.02% by weight.

7. A process according to claim 1, wherein said ratio by weight is from 1.5:1 to 8:1.

8. A process according to claim 1, wherein said ratio by weight is from 1.5:1 to 6:1.

9. A process according to claim 1, wherein, below the point of withdrawal of said practically anhydrous alkanols, a third zone of four to twenty-five theoretical trays is maintained in said column, drawing off said alkanols as a branch stream from said column, and removing the constituents of higher boiling point, which were fed to said column in said feed mixture, at the base of the column.

10. A process as claimed in claim 1 wherein the amount of said upper organic phase which is withdrawn is twice to six times the weight of said azeotrope-forming byproducts present in said feed mixture.

References Cited by the Examiner

UNITED STATES PATENTS

| 1,831,425 | 11/1931 | Ricard | 203—85 |
| 2,874,096 | 2/1959 | Scheeline et al. | 203—85 |
| 2,891,895 | 6/1959 | Stewart et al. | 203—76 |
| 3,026,254 | 3/1962 | Hutto | 203—83 |
| 3,156,629 | 11/1964 | Ester | 260—643 |
| 3,214,347 | 10/1965 | Grekel et al. | 203—96 |

NORMAN YUDKOFF, *Primary Examiner.*

WILBUR BASCOMB, *Examiner.*